US012243314B2

(12) United States Patent
Ding et al.

(10) Patent No.: US 12,243,314 B2
(45) Date of Patent: Mar. 4, 2025

(54) METHOD AND SYSTEM FOR RECOGNIZING HUMAN ACTION IN APRON BASED ON THERMAL INFRARED VISION

(71) Applicant: Nanjing University of Aeronautics and Astronautics, Jiangsu (CN)

(72) Inventors: Meng Ding, Nanjing (CN); Yuanyuan Ding, Nanjing (CN); Xianghao Kong, Nanjing (CN); Yiming Xu, Nanjing (CN); Yi Wu, Nanjing (CN); Wei Lu, Nanjing (CN)

(73) Assignee: Nanjing University of Aeronautics and Astronautics, Jiangsu (CN)

( * ) Notice: Subject to any disclaimer, the term of this patent is extended or adjusted under 35 U.S.C. 154(b) by 0 days.

(21) Appl. No.: 18/007,599

(22) PCT Filed: Dec. 6, 2021

(86) PCT No.: PCT/CN2021/135634
§ 371 (c)(1),
(2) Date: Dec. 1, 2022

(87) PCT Pub. No.: WO2023/087420
PCT Pub. Date: May 25, 2023

(65) Prior Publication Data
US 2024/0265703 A1 Aug. 8, 2024

(30) Foreign Application Priority Data
Nov. 17, 2021 (CN) .......................... 202111362718.1

(51) Int. Cl.
*G06V 40/20* (2022.01)
*G06V 10/77* (2022.01)
(Continued)

(52) U.S. Cl.
CPC .......... *G06V 20/52* (2022.01); *G06V 10/7715* (2022.01); *G06V 10/774* (2022.01);
(Continued)

(58) Field of Classification Search
CPC ........ G06V 20/52; G06V 20/41; G06V 20/44; G06V 20/70; G06V 10/7715; G06V 10/82;
(Continued)

(56) References Cited

U.S. PATENT DOCUMENTS 11,055,872 B1 * 7/2021 Chen .................... G06V 10/764

FOREIGN PATENT DOCUMENTS

CN 108985259 A * 12/2018 .......... G06K 9/6256
CN 110378259 A * 10/2019
(Continued)

OTHER PUBLICATIONS

Xu, Lu, Xian Zhong, Wenxuan Liu, Shilei Zhao, Zhengwei Yang, and Luo Zhong. "Subspace enhancement and colorization network for infrared video action recognition." In Pacific Rim International Conference on Artificial Intelligence, pp. 321-336. Cham: Springer International Publishing, 2021. (Year: 2021).*
(Continued)

*Primary Examiner* — Carol W Chan
(74) *Attorney, Agent, or Firm* — Spencer Fane LLP

(57) ABSTRACT

The present disclosure discloses a method and system for recognizing human action in an apron based on thermal infrared vision, the method comprises: acquiring a plurality of video sequences from an infrared monitoring video; labeling a set target in each image frame in each video sequence with a target box to obtain a target tracking result; intercepting, for each image frame in the video sequence, a target-box enlarged area according to the labeled target box; adding, for each image frame in the video sequence, the
(Continued)

position information of the image labeled with target box to the target-box enlarged area to obtain a three-channel sub-image; training an action recognition model by using three-channel sub-image sequences corresponding to a plurality of video sequences as a training set, to obtain a trained action recognition model; obtaining a to-be-recognized video sequence from another infrared monitoring video, and obtaining a three-channel sub-image sequence corresponding to the to-be-recognized video sequence; inputting the three-channel sub-image sequence corresponding to the to-be-recognized video sequence into the trained action recognition model to output a target action type.

10 Claims, 4 Drawing Sheets

(51) Int. Cl.
*G06V 10/774* (2022.01)
*G06V 20/40* (2022.01)
*G06V 20/52* (2022.01)
*G06V 20/70* (2022.01)

(52) U.S. Cl.
CPC .............. *G06V 20/41* (2022.01); *G06V 20/70* (2022.01); *G06V 40/20* (2022.01)

(58) Field of Classification Search
CPC ...... G06V 10/774; G06V 40/20; G06F 18/00; G06F 18/24; G06N 3/045; G06N 3/049; G06N 3/08
See application file for complete search history.

(56) References Cited

FOREIGN PATENT DOCUMENTS

| CN | 109255284 B | * | 2/2021 | ......... G06K 9/00362 |
| CN | 113158983 A | * | 7/2021 | |

OTHER PUBLICATIONS

Ding, Meng, Yuan-yuan Ding, Xiao-zhou Wu, Xu-hui Wang, and Yu-bin Xu. "Action recognition of individuals on an airport apron based on tracking bounding boxes of the thermal infrared target." Infrared Physics & Technology 117 (2021): 103859. (Year: 2021).*

* cited by examiner

METHOD AND SYSTEM FOR RECOGNIZING HUMAN ACTION IN APRON BASED ON THERMAL INFRARED VISION

CROSS REFERENCE TO RELATED APPLICATION

This patent application is a national stage of International Application No. PCT/CN2021/135634, filed on Dec. 6, 2021, which claims the priority to Chinese Patent Application No. 202111362718.1, entitled "Method and System for Recognizing Human Action in Apron based on Thermal Infrared Vision" filed with China National Intellectual Property Administration on Nov. 17, 2021, the disclosure of which is incorporated by reference herein in its entirety.

TECHNICAL FIELD

The disclosure relates to the technical field of intelligent video monitoring, in particular to a method and system for recognizing a human action in an apron based on thermal infrared vision.

BACKGROUND ART

In order to improve the safety and efficiency of transportation, transportation infrastructure and services increasingly rely on intelligent visual monitoring technology. Computer vision is being used to solve a series of problems such as accident detection and road condition monitoring. Civil aviation airports are important providers for transportation infrastructure and services, and their safety and efficiency is crucial. Compared with other areas of the airport ground, the apron has particularly prominent safety problem due to frequent work activities of aircraft and vehicles on the apron and complex personnel occurring on the apron. In addition, because of the low visibility at night and the lack of effective monitoring methods, the probability of unsafe incidents at night is much higher than that during the day. Therefore, it is very important to improve the monitoring ability of the apron area under low visibility conditions.

In order to accomplish the monitoring task under low visibility conditions, a thermal infrared (TIR) camera is used instead of a visible light camera to receive thermal radiation from different objects, and then the temperature difference of the objects is converted into brightness values of image pixels, to capture the activities on the airport apron under low visibility conditions. Compared with the monitoring technology based on the visible light spectrum, the inherent defects of infrared images, such as blurred edges, low signal-to-noise ratio and lack of color and texture information, bring more challenges to action recognition based on infrared image sequences.

SUMMARY

In view of this, the present disclosure aims to provide a method and system for recognizing a human action in an apron based on thermal infrared vision, so that the recognition accuracy is improved.

In order to achieve the above purpose, the present disclosure provides a method for recognizing a human action in an apron based on thermal infrared vision, including:

acquiring a plurality of video sequences from an infrared monitoring video, wherein the plurality of video sequences include a plurality of types of preset target actions;

labeling a set target in each image frame in each video sequence with a target to obtain a target tracking result, wherein the target tracking result includes position information of image labeled with the target box in each frame;

intercepting, for each image frame in the video sequence, a target-box enlarged area according to the labeled target box, wherein a side length of the target-box enlarged area is greater than a maximum side length of the corresponding target box;

adding, for each image frame in the video sequence, the position information of the image labeled with target box to the target-box enlarged area to obtain a three-channel sub-image, wherein the three-channel sub-image includes an abscissa channel image, an ordinate channel image and an image corresponding to the target-box enlarged area, and various three-channel sub-images are arranged in chronological order to form a three-channel sub-image sequence;

training an action recognition model by using a plurality of three-channel sub-image sequences corresponding to a plurality of video sequences as a training set to obtain a trained action recognition model;

obtaining a to-be-recognized video sequence from another infrared monitoring video, and obtaining a three-channel sub-image sequence corresponding to the to-be-recognized video sequence;

inputting the three-channel sub-image sequence corresponding to the to-be-recognized video sequence into the trained action recognition model to output a target action type.

Alternatively, the action recognition model includes a spatial feature extraction network and a spatiotemporal feature extraction network, an output of the spatial feature extraction network is connected to an input of the spatiotemporal feature extraction network; the spatial feature extraction network includes six convolutional layers and three maximum pooling layers; and the spatio spatial feature extraction network includes three layers of convLSTM.

Alternatively, an input of the action recognition model is a three-channel sub-image sequence of 30 frames.

Alternatively, the action recognition model also includes a Softmax function, which is used to determine classification results.

Alternatively, the target-box enlarged area frame is a square, and a side length of the square is expressed as:

$$L_i = \sqrt{\left(w_i + \alpha\frac{w_i + h_i}{2}\right)\left(h_i + \alpha\frac{w_i + h_i}{2}\right)}$$

where $L_i$ represents the side length of the target-box enlarged area corresponding to a i-th frame image in the video sequence, $\alpha$ is a scale coefficient, $w_i$ represents a short side length of the target box, and $h_i$ represents a long side length of the target box.

The present disclosure also discloses a system for recognizing a human action in an apron based on thermal infrared vision, including:

a video sequence obtaining module configured to obtain a plurality of video sequences from an infrared monitoring video, wherein the plurality of video sequences include a plurality of types of preset target actions;

a target box labeling module configured to, label a set target in each image frame in each video sequence with a target box to obtain a target tracking result, wherein the target tracking result includes position information of an image labeled with the target box in each frame;

a target box enlargement module configured to, for each image frame in the video sequence, intercept a target-box enlarged area according to the labeled target box, wherein a side length of the target-box enlarged area is greater than a maximum side length of the corresponding target box;

a three-channel sub-image sequence determining module configured to, for each image frame in the video sequence, add the position information of the image labeled with the target box to the target-box enlarged area so as to obtain a three-channel sub-image, where the three-channel sub-image includes an abscissa channel image, an ordinate channel image, and an image corresponding to the target-box enlarged area; and various three-channel sub-images are arranged in chronological order form a three-channel sub-image sequence;

an action recognition model training module configured to train an action recognition model by using a plurality of three-channel sub-image sequences corresponding to a plurality of video sequences as a training set, so as to obtain a trained action recognition model;

a to-be-recognized video sequence obtaining module configured to obtain the to-be-recognized video sequence from another infrared monitoring video, and to obtain a three-channel sub-image sequence corresponding to the to-be-recognized video sequence;

a target action recognition module configured to input the three-channel sub-image sequence corresponding to the to-be-recognized video sequence into the trained action recognition model, so as to output a target action type.

Alternatively, the action recognition model includes a spatial feature extraction network and a spatiotemporal feature extraction network, an output of the spatial feature extraction network is connected to an input of the spatiotemporal feature extraction network; the spatial feature extraction network includes six convolutional layers and three maximum pooling layers; and the spatiospatial feature extraction network includes three layers of convLSTM.

Alternatively, an input of the action recognition model is a three-channel sub-image sequence of 30 frames.

Alternatively, the action recognition model also includes a Softmax function, which is used to determine classification results.

Alternatively, the target-box enlarged area is a square, and a side length of the square is expressed as:

$$L_i = \sqrt{\left(w_i + \alpha \frac{w_i + h_i}{2}\right)\left(h_i + \alpha \frac{w_i + h_i}{2}\right)}$$

where $L_i$ represents a side length of the target-box enlarged area corresponding to a i-th frame image in the video sequence, $\alpha$ is a scale coefficient, $w_i$ represents a short side length of the target box, and $h_i$ represents a long side length of the target box.

According to the specific embodiments provided by the present disclosure, the present discloses the following technical effects.

In the present disclosure, the target box amplification area is intercepted according to the labeled target box, so that the effective background information around the target is obtained, and the position information of the labeled image of the target box is added to the target box amplification area to obtain a three-channel sub-image, so that the problems of low signal-to-noise ratio of an infrared image and background interference of a monitoring image are effectively solved, and the recognition accuracy of human actions is improved.

BRIEF DESCRIPTION OF THE DRAWINGS

In order to more clearly illustrate the embodiments of the present disclosure or the technical solutions in the prior art, the drawings required in the embodiments will be briefly introduced below. Obviously, the drawings in the following description are only some of the present disclosure, for those of ordinary skill in the art, other drawings may also be obtained from these drawings without any creative effort.

DETAILED DESCRIPTION OF THE EMBODIMENTS

In the following, the technical solutions in the embodiments of the present disclosure will be clearly and completely described with reference to the accompanying drawings in the embodiments of the present disclosure. Apparently, the described embodiments are only a part of the embodiments of the present disclosure, but not all of the embodiments. Based on the embodiments of the present disclosure, all other embodiments obtained by those of ordinary skill in the art without creative efforts belong to the protection scope of the present disclosure.

The purpose of the embodiments is to provide a method and system for recognizing a human action in an apron based on thermal infrared vision, which improves the recognition accuracy.

In order to make the above objects, features and advantages of the present disclosure more readily apparent, the present disclosure will be described in further detail below with reference to the accompanying drawings and the detailed description of the embodiments.

Figure 1:
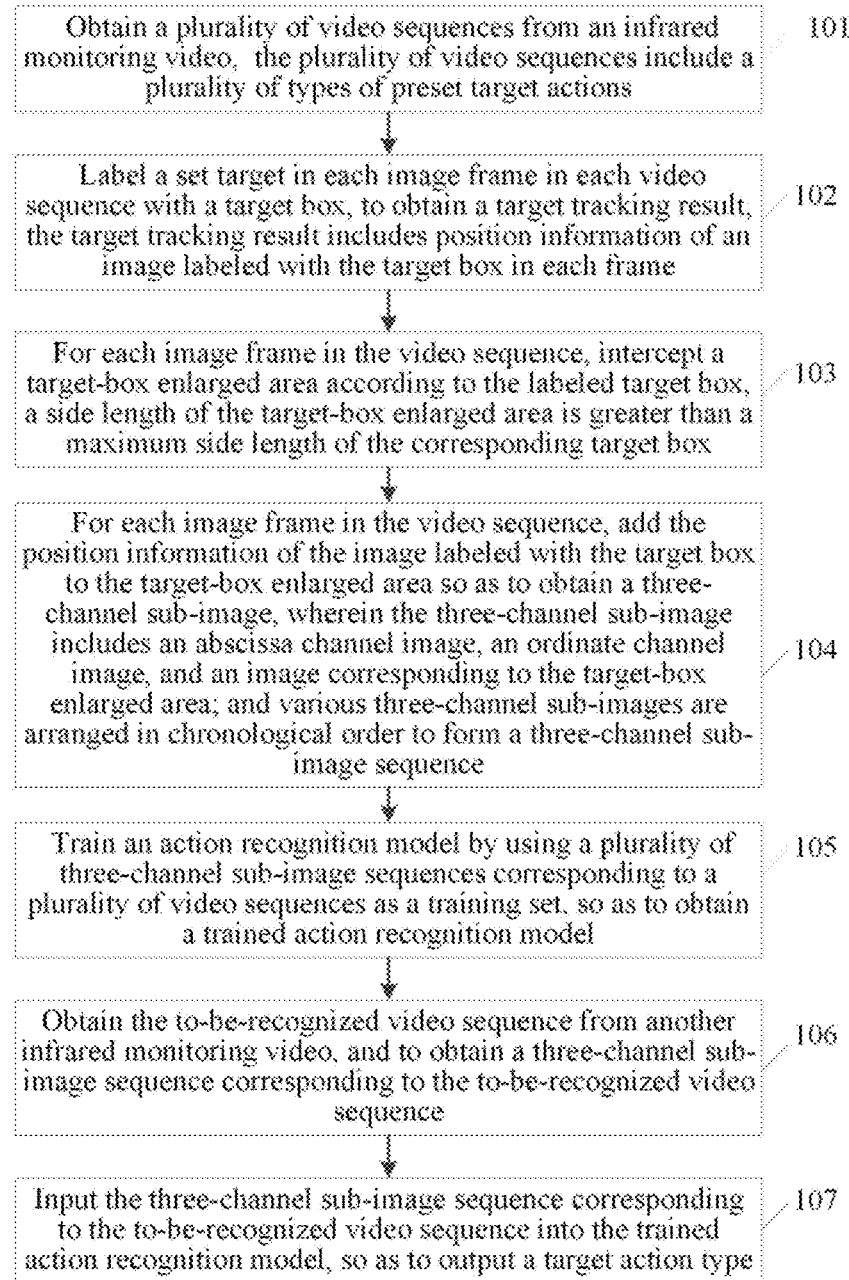
FIG. 1 is a schematic flowchart of a method for recognizing a human action in an apron based on thermal infrared vision according to the present disclosure.

FIG. 1 is a schematic flowchart of a method for recognizing a human action in an apron based on thermal infrared vision according to the present disclosure. As shown in FIG. 1, the method for recognizing a human action in an apron based on thermal infrared vision includes the following steps.

In step 101, a plurality of video sequences are acquired from an infrared monitoring video, each video sequence include a plurality of types of preset target actions.

Figure 2:
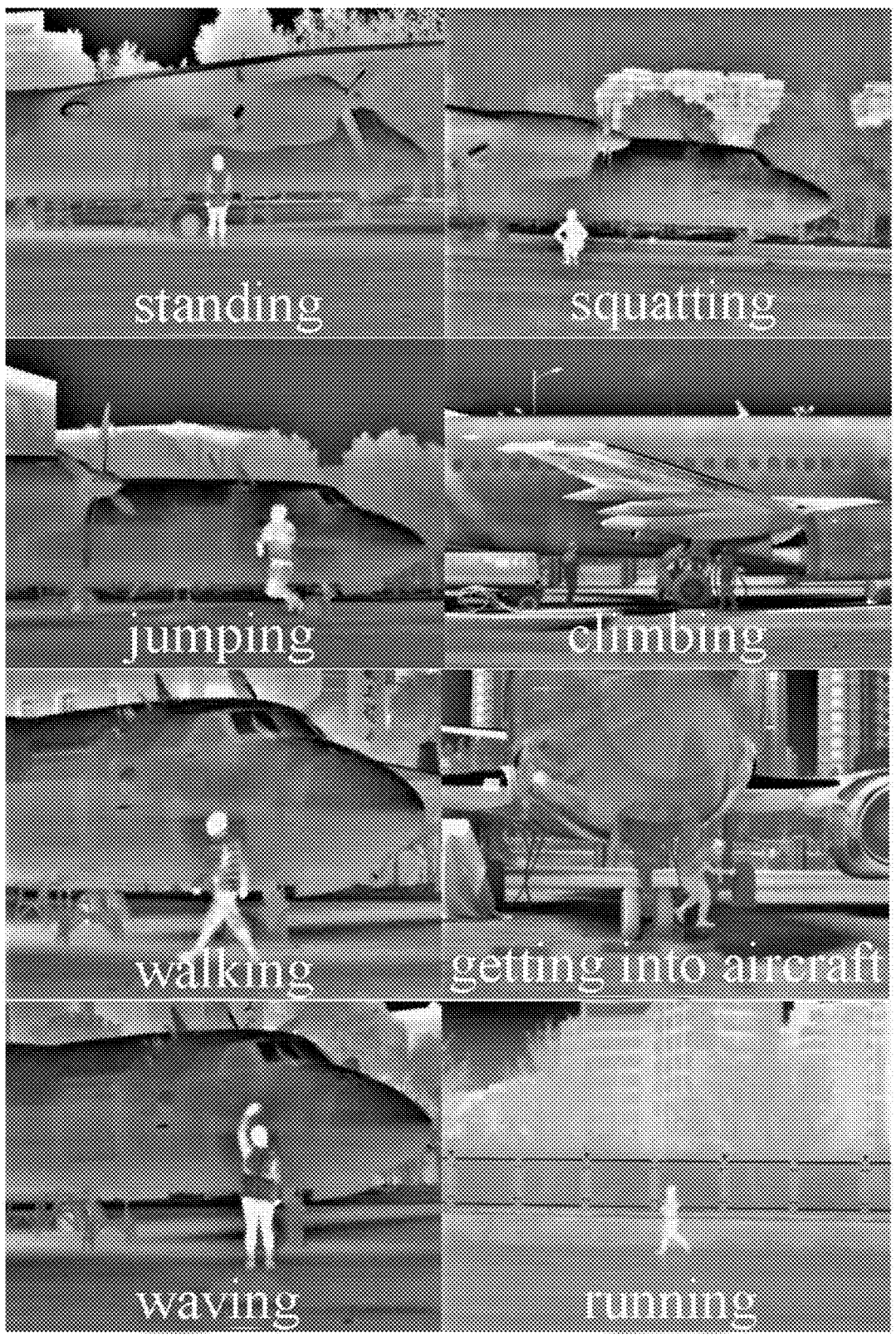
FIG. 2 is an example image of behavior categories of the present disclosure.

With the airport apron as the background, the preset target actions include standing, walking, running, jumping, squatting, waving, climbing and getting into aircraft, where standing and walking are normal behaviors, running, jumping, squatting, waving, climbing and getting into aircraft tare abnormal behaviors, as shown in FIG. 2.

In step 102, a set target in each image frame in the video sequence is labeled with a target box, to obtain a target tracking result including position information of an image labeled with the target box in each frame.

The target tracking result is expressed as $[u_i, v_i, w_i, h_i]$, $i=1, 2, \ldots, n$, $u_i$ denotes an abscissa of an upper left corner of a target box in the i-th image frame, $v_i$ is an ordinate of an upper left corner of the target box, $w_i$ is a width of the target box (a length of a short side), $h_i$ is a height of the target box (a length of a long side), and n denotes a number of image frames in the video sequence.

In step 103, for each image frame in the video sequence, an target-box enlarged area is intercepted according to the labeled target box, and the side length of the target-box enlarged area is greater than the maximum side length of the corresponding target box.

The target-box enlarged area is a square, and the side length of the square is expressed as:

$$L_i = \sqrt{\left(w_i + \alpha \frac{w_i + h_i}{2}\right)\left(h_i + \alpha \frac{w_i + h_i}{2}\right)};$$

wherein, $L_i$ represents the side length of the corresponding target-box enlarged area of the i-th image frame in the video sequence, $\alpha$ is a scale coefficient, and a is set to 1.5.

In step 104, for each image frame in the video sequence, the position information of the image labeled with target box is added to the target-box enlarged area to obtain a three-channel sub-image. The three-channel sub-image includes an abscissa channel image, an ordinate channel image and an image corresponding to the target-box enlarged area, and various three-channel sub-images are arranged in chronological order to form a three-channel sub-image sequence.

The abscissa channel image is denoted by $U_i$, and $U_i$ represents a set of the abscissas of various pixel points in the target box. The ordinate channel image is denoted by $V_i$, and $V_i$ represents a set of the ordinates of various pixel points in the target box. A image corresponding to the target-box enlarged area is denoted by $S_i$, and the resultant three-channel sub-image sequence is denoted by $T_i$, $i=1, 2, \ldots, n$.

$$U_i = \begin{bmatrix} u_i & u_i + \frac{w_i - 1}{L_i - 1} & \ldots & u_i + w_i - 1 \\ u_i & u_i + \frac{w_i - 1}{L_i - 1} & \ldots & u_i + w_i - 1 \\ \vdots & \vdots & \ddots & \vdots \\ u_i & u_i + \frac{w_i - 1}{L_i - 1} & \ldots & u_i + w_i - 1 \end{bmatrix},$$

$$V_i = \begin{bmatrix} v_i & v_i & \ldots & v_i \\ v_i + \frac{h_i - 1}{L_i - 1} & v_i + \frac{h_i - 1}{L_i - 1} & \ldots & v_i + \frac{h_i - 1}{L_i - 1} \\ \vdots & \vdots & \ddots & \vdots \\ v_i + h_i - 1 & v_i + h_i - 1 & \ldots & v_i + h_i - 1 \end{bmatrix};$$

The channel sizes of the $U_i$ channel and the $V_i$ channel representing the abscissa and ordinate of each pixel point in the target box are equal to the size of the intercepted target image $S_i$.

Figure 3:
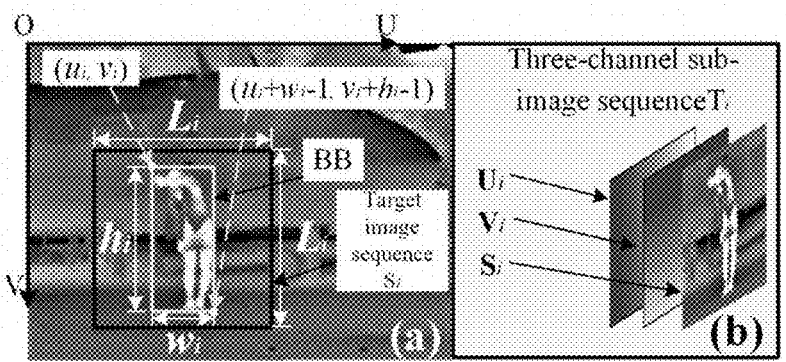
FIG. 3 is a schematic diagram of a principle for acquiring three-channel sub-image sequence according to the present disclosure.

The principle for acquiring the three-channel sub-image sequence is shown in FIG. 3. (a) in FIG. 3 is a schematic diagram of the target-box enlarged area and the acquired $U_i$ channel and $V_i$ channel. (b) in FIG. 3 is a schematic diagram of $T_i$ composed of the acquired $U_i$ channel, the acquired $V_i$ channel and the target image $S_i$.

In step 105, the action recognition model is trained by using the three-channel sub-image sequences corresponding to a plurality of video sequences as a training set to obtain a trained action recognition model.

In step 106, a video sequence to be recognized is obtained from the infrared monitoring video, and a three-channel sub-image sequence corresponding to the video sequence to be recognized is obtained.

In step 107, the three-channel sub-image sequence corresponding to the video sequence to be recognized is input into the trained action recognition model, to output the target action type.

The action recognition model includes a spatial feature extraction network and a spatiotemporal feature extraction network, and an output of the spatial feature extraction network is connected to an input of the spatiotemporal feature extraction network. The spatial feature extraction network includes six convolutional layers and three maximum pooling layers; and the spatiospatial feature extraction network includes three layers of convLSTM.

Figure 4:
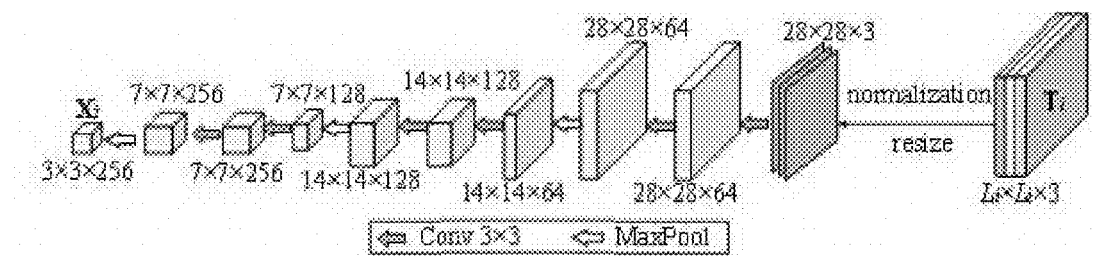
FIG. 4 is a schematic structural diagram of a spatial feature extraction network according to the present disclosure.

The structure of the spatial feature extraction network is shown in FIG. 4. Every two convolution layers are followed by and connected with a maximum pooling layer, and an input sequence $T_i$ is normalized and resized to obtain an input tensor with a size of 28×28×3, and then subjected to convolution and pooling, to output 30 tensors $X_i$ with a size of 3×3×256.

The input of the action recognition model is a three-channel sub-image sequence of 30 frames (corresponding to a time duration of about 4 s).

The action recognition model also includes a Softmax function, which is used to determine the classification results.

Hereinafter, the method for recognizing a human action in an apron based on thermal infrared vision of the present disclosure will be described in detail.

In S1, an action recognition model for specific target behavior is constructed.

In S11, complete video sequences of various target actions are intercepted from the infrared monitoring video, and the training and verification data sets for recognizing a human action in the apron are constructed.

The sampling frequency of the video sequence is 8 Hz, and the pixel value of each frame is 384×288. The data set has a total of 2000 action clips (video sequences) each containing 30 image frames, and the ratio of training set and validation set in terms of data volume is 7:1.

In S12, a specific target in each frame of the video is labeled with a tracking frame, to obtain continuous target tracking results of the image sequence $[u_i, v_i, w_i, h_i]$, $i=1, 2, \ldots, n$, where n denotes length of image sequence, four parameters denotes an abscissas and an ordinates of an upper left corner of the target box and a width and a height of the target box in the i-th frame image.

In S13, based on the target tracking result, an target-box enlarged area containing partial effective background information around the target are intercepted from each image frame to obtain a target image sequence $S_i$, $i=1, 2, \ldots, n$.

The method for intercepting the target-box enlarged area containing partial effective background information around the target is as follows: obtaining a central point position of the target and the width and height (($w_i \times h_i$) of the target box according to the tracking result, where I being a frame index in the sequence; calculating a side length $L_i$ of the intercepted region.

A square area $S_i$ is intercepted with target center of each frame as the interception center, and $L_i$ as the side length.

In S14, the position moving information of the target in the original image is mapped to the size of the two-dimensional image, to obtain tensors $U_i$ and $V_i$, which are added to the third dimension of the target image $S_i$ to form a final three-channel sub-image sequence $T_i$, i=1, 2, ..., n.

The step S14 of adding position moving information to the target image to obtain a three-channel sub-image sequence includes: calculating a $U_i$ channel and a $V_i$ channel, representing an abscissas and an ordinates, of each pixel point in the target box according to the target tracking result, namely the abscissas and ordinates of the upper left corner of the target box and the width and height [$u_i$, $v_i$, $w_i$, $h_i$] the target box, the size of the $U_i$ channel and the $V_i$ channel being equal to the size of the intercepted target image $S_i$.

By connecting the normalized U; channel and $V_i$ channel to the third dimension of the target image channel $S_i$, a three-dimensional feature tensor with a size of $L_i \times L_i \times 3$ is formed as a sub-image sequence $T_i$, which is input to the subsequent action recognition model, as shown in FIG. 4.

In S15, a convolutional neural network (spatial feature extraction network) for extracting spatial features and a convolutional long-short-term memory network (convLSTM) for extracting spatiotemporal features are constructed, and a softmax function and a fully connected layer for classification are introduced to generate a network structure model for target behavior recognition.

Figure 5:
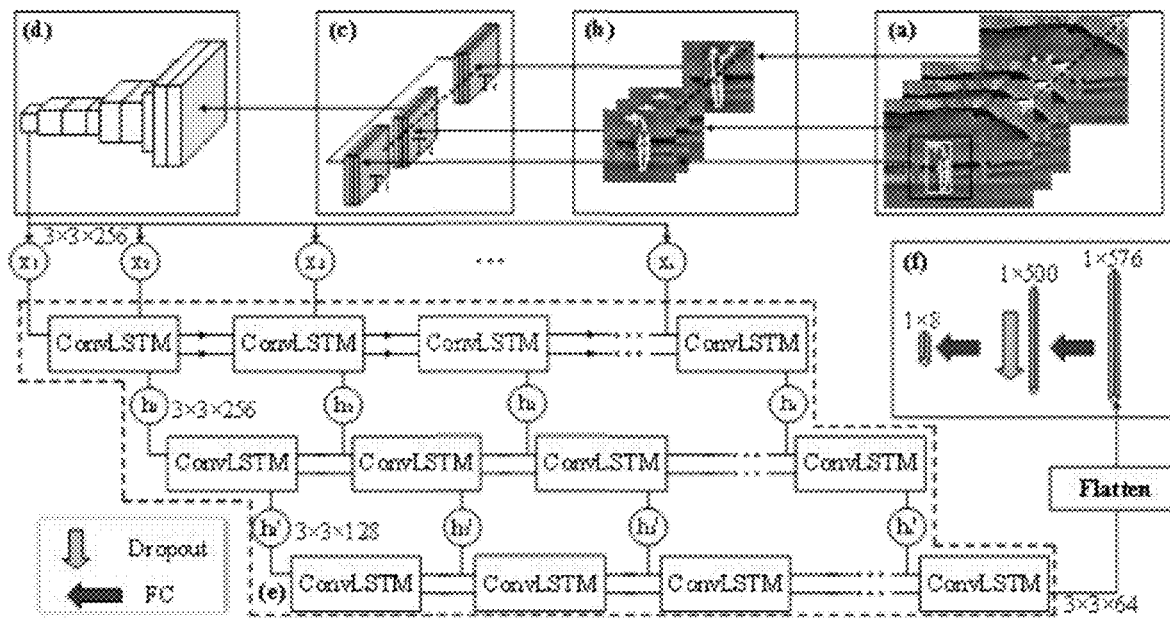
FIG. 5 is a schematic diagram of a data flow in an action recognition model according to the present disclosure.

The specific process of building the behavior recognition network model in S15 includes the following steps. Firstly, $T_i$ (i=1, 2, ..., n) obtained in S14 is subjected to zero-centered normalization and resizing operations to obtain an input tensor with a time sequence element of 30 and a size of 28×28×3, and subsequently is passed through a spatial feature extraction network composed of 6 convolution layers and 3 maximum pooling layers to output 30 tensors with a size of 3×3×256, as shown in FIG. 4. Then, the 30 tensors with a size of 3×3×256 are fed to the spatiotemporal feature extraction network composed of three layers of convLSTM, to output feature tensors of size 1×3×3×64. Next, the spatiotemporal features are flattened into vectors, which are then fed into two fully connected layers to experience classification by the Softmax function, so as to obtain classification results, as shown in FIG. 5. (a) of FIG. 5 shows an infrared video sequence containing n frames as an input for action recognition in step S11; (b) shows the sub-image obtained from the target tracking result in step S12; (c) shows the input tensor obtained after preprocessing in step S14; (d) shows the CNN network (spatial feature extraction network) for spatial feature extraction in step S15, and the output sequence from the spatial feature extraction network is $x_1, x_2, \ldots, x_t$, t represents the serial number; (e) shows a spatiotemporal feature extraction network based on the convLSTM in step S15, which includes three layers of convLSTM, the first layer of convLSTM outputs $h_1, h_2, \ldots, h_t$, the second layer of convLSTM outputs $h_1', h_2', \ldots, h_t'$; (f) shows two FC Layers (Fully Connected Layers) for action classification in Step S15, the downward arrow in (f) of FIG. 5 represents dropout processing, and the horizontal arrow represents a full connection operation.

In S16, the constructed behavior recognition network is trained by using a training data set for recognizing the human action in the apron, to adjust the hyper parameters in the action recognition model by accuracy evaluation and determine the weights of the network, thereby obtaining the final action recognition model suitable for the target personal moving on the apron.

In S16, ADAM optimizer with exponential decay rate $\beta_1=0.9$, $\beta_2=0.999$ is used as the training strategy of the behavior recognition network model, the initial learning rate is set to 0.0005, the learning rate decay strategy adopts the cosine annealing method, the dropout rate of the fully connected layer is set to 0.5, and the loss function adopts the cross entropy loss function.

In S2, a behavior action of a personal in airport apron are identified.

In S21, a specific target in an infrared monitoring video is tracked to obtain a target tracking result with a time sequence length.

In S22, the image sequence preprocessing in steps S13-S14 is performed on the target tracking result obtained in step S21 to obtain a three-channel sub-image sequence $T_i$.

In S23, the obtained three-channel sub-image sequence is input into the action recognition model for recognition, to obtain the action type of the target.

The input of the action recognition model is a preprocessed sub-image sequence of 30 frames (corresponding to a time duration of about 4 s).

For the method for recognizing a human action in an apron based on thermal infrared vision according to the embodiments of the present disclosure, the neural network is trained and tested on a desktop workstation, in which a hardware platform adopts an Intel® Xeon® E5-1620 v4 CPU@3.50 GHz CPU with a memory size of 64 GB and an NVIDIA GTX 1060 6 GB GPU; and the program runs on the Keras application programming interface (API) based on the Tensorflow backend engine, and is built and implemented in Python 3.6.10.

The method for recognizing a human action in an apron based on the thermal infrared vision has the following beneficial effects.

1. The method of the present disclosure integrates a preprocessing module based on target tracking results, a CNN-based spatial feature extraction module, a spatiotemporal feature extraction module based on three layers of convolution LSTM (ConvLSTM) and a classification layer consisting of two fully connected layers (FC). The method according to the disclosure can better recognize the target behavior under the condition of low visibility, and can be applied to the recognition of the action or behavior happened in open field under a complex environment of various personnel.

2. For the characteristics of small target imaging proportion in an apron environment and a scene monitoring system, the method intercepts the target and effective background information around the target according to tracking results, so as to effectively solves the problems of low signal-to-noise ratio of an infrared image and background interference of monitored images, and the method can monitor the specific target in a video with a plurality of moving targets, and is more close to an actual engineering application background.

3. In view of loss of the original position information of the target due to extraction of the tracking frame and for effectively integrating motion characteristics of the target, the present disclosure connects the coordinate position of the target box in the original image as two independent channels to a channel dimension of the image in series, to facilitate subsequent convolution processing, which considers less computational effort and rich feature information both, and improves the action classification accuracy and recognition speed.

Figure 6:
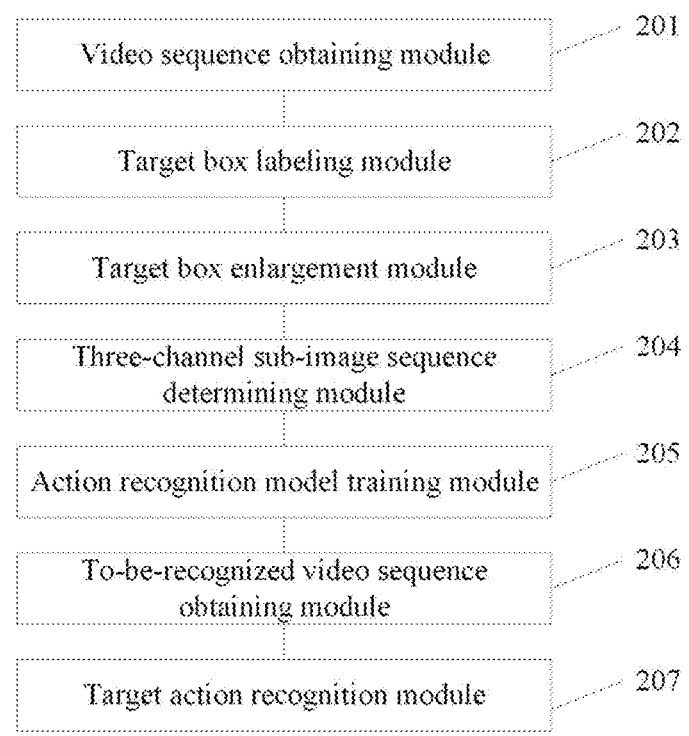
FIG. 6 is a schematic structural diagram of a system for recognizing a human action in an apron based on thermal infrared vision according to the present disclosure.

FIG. 6 is a schematic structural diagram of a system for recognizing a human action in an apron based on thermal infrared vision according to the present disclosure. As shown in FIG. 6, the system for recognizing the human action in the apron based on thermal infrared vision includes the following modules.

A video sequence obtaining module 201 is configured to obtain a plurality of video sequences from an infrared monitoring video, and the video sequences include a plurality of types of preset target actions.

A target box labeling module 202 is configured to, label a set target in each image frame in the video sequence with a target box, to obtain a target tracking result, the target tracking result includes position information of the target box labeled image in each frame.

A target box enlargement module 203 is configured to, for each image frame in the video sequence, intercept a target-box enlarged area according to the labeled target box, and a side length of the target-box enlarged area is greater than the maximum side length of the corresponding target box.

A three-channel sub-image sequence determining module 204 is configured to, for each image frame in the video sequence, add position information of an image labeled with the target box to the target-box enlarged area so as to obtain a three-channel sub-image, and the three-channel sub-image includes an abscissa channel image, an ordinate channel image, and an image corresponding to the target-box enlarged area. Various three-channel sub-images are arranged in chronological order to form a three-channel sub-image sequence.

An action recognition model training module 205 is configured to train an action recognition model by using the three-channel sub-image sequences corresponding to a plurality of video sequences as a training set, so as to obtain a trained action recognition model.

A to-be-recognized video sequence obtaining module 206 is configured to obtain the video sequence to be recognized from the infrared monitoring video, and to obtain a three-channel sub-image sequence corresponding to the video sequence to the be recognized.

A target action recognition module 207 is configured to input the three-channel sub-image sequence corresponding to the video sequence to be recognized into the trained action recognition model, so as to output a target action type.

An action recognition model includes a spatial feature extraction network and a spatiotemporal feature extraction network, the output of the spatial feature extraction network is connected to the input of the spatiotemporal feature extraction network; the spatial feature acquisition network includes six convolutional layers and three maximum pooling layers; and the spatiospatial feature extraction network includes three layers of convLSTM.

The input of the action recognition model is a three-channel sub-image sequence of 30 frames.

The action recognition model also includes a Softmax function, which is used to determine the classification results.

The target-box enlarged area is a square, and a side length of the square is expressed as:

$$L_i = \sqrt{\left(w_i + \alpha \frac{w_i + h_i}{2}\right)\left(h_i + \alpha \frac{w_i + h_i}{2}\right)};$$

where $L_i$ represents a side length of the target-box enlarged area corresponding to the i-th frame image in the video sequence, a is the scale coefficient, $w_i$ represents a short side length of the target box, and $h_i$ represents a long side length of the target box.

In this specification, each embodiment is described in a progressive manner, and each embodiment focuses on the differences from other embodiments, and the same and similar parts among various embodiment can be referred to each other.

In this specification, the principles and embodiments of the present disclosure have been described with reference to specific examples, and the description of the above embodiments is only used to help understand the methodology and concept of the present disclosure; further, for those of ordinary skilled in the art, there may be changes in the specific embodiments and application scope according to the idea of the present disclosure. In conclusion, the contents of this specification should not be construed as limiting the present disclosure.

What is claimed is:

1. A method for recognizing a human action in an apron based on thermal infrared vision, comprising:
   acquiring a plurality of video sequences from an infrared monitoring video, wherein the plurality of video sequences comprise a plurality of types of preset target actions;
   labeling a set target in each image frame in each video sequence with a target box to obtain a target tracking result, wherein the target tracking result comprises position information of an image labeled with the target box, in each frame;
   intercepting, for each image frame in each video sequence, a target-box enlarged area according to the labeled target box, wherein a side length of the target-box enlarged area is greater than a maximum side length of the corresponding labeled target box;
   adding, for each image frame in each video sequence, the position information of the image labeled with target box to the target-box enlarged area to obtain a three-channel sub-image, wherein the three-channel sub-image includes an abscissa channel image, an ordinate channel image and an image corresponding to the target-box enlarged area, and various three-channel sub-images are arranged in chronological order to form a three-channel sub-image sequence;
   training an action recognition model by using a plurality of three-channel sub-image sequences corresponding to a plurality of video sequences as a training set, to obtain a trained action recognition model;
   obtaining a to-be-recognized video sequence from another infrared monitoring video, and obtaining a three-channel sub-image sequence corresponding to the to-be-recognized video sequence;
   inputting the three-channel sub-image sequence corresponding to the to-be-recognized video sequence into the trained action recognition model to output a target action type.

2. The method according to 1, wherein the action recognition model includes a spatial feature extraction network and a spatiotemporal feature extraction network, an output of the spatial feature extraction network is connected to an input of the spatiotemporal feature extraction network; the spatial feature extraction network includes six convolutional layers and three maximum pooling layers; and the spatiospatial feature extraction network includes three layers of convLSTM.

3. The method according to 1, wherein an input of the action recognition model is a three-channel sub-image sequence of 30 frames.

4. The method according to 1, wherein the action recognition model also includes a Softmax function, and the Softmax function is used to determine classification results.

5. The method according to 1, wherein the target-box enlarged area is a square, and a side length of the square is expressed as:

$$L_i = \sqrt{\left(w_i + \alpha\frac{w_i + h_i}{2}\right)\left(h_i + \alpha\frac{w_i + h_i}{2}\right)};$$

where $L_i$ represents a side length of the target-box enlarged area corresponding to a i-th frame image in the video sequence, $\alpha$ is a scale coefficient, $w_i$ represents a short side length of the target box, and $h_i$ represents a long side length of the target box.

6. A system for recognizing a human action in an apron based on thermal infrared vision, comprising:
  a video sequence obtaining module configured to obtain a plurality of video sequences from an infrared monitoring video, wherein the plurality of video sequences include a plurality of types of preset target actions;
  a target box labeling module configured to label a set target in each image frame in each video sequence with a target box, to obtain a target tracking result, wherein the target tracking result includes position information of an image labeled with the target box, in each frame;
  a target box enlargement module configured to, for each image frame in each video sequence, intercept a target-box enlarged area according to the labeled target box, wherein a side length of the target-box enlarged area is greater than a maximum side length of the corresponding labeled target box;
  a three-channel sub-image sequence determining module configured to, for each image frame in each video sequence, add the position information of the image labeled with the target box to the target-box enlarged area so as to obtain a three-channel sub-image, wherein the three-channel sub-image includes an abscissa channel image, an ordinate channel image, and an image corresponding to the target-box enlarged area; and various three-channel sub-images are arranged in chronological order to form a three-channel sub-image sequence;
  an action recognition model training module configured to train an action recognition model by using a plurality of three-channel sub-image sequences corresponding to a plurality of video sequences as a training set, so as to obtain a trained action recognition model;
  a to-be-recognized video sequence obtaining module configured to obtain the to-be-recognized video sequence from another infrared monitoring video, and to obtain a three-channel sub-image sequence corresponding to the to-be-recognized video sequence;
  a target action recognition module configured to input the three-channel sub-image sequence corresponding to the to-be-recognized video sequence into the trained action recognition model, so as to output a target action type.

7. The system according to 6, wherein the action recognition model includes a spatial feature extraction network and a spatiotemporal feature extraction network, an output of the spatial feature extraction network is connected to an input of the spatiotemporal feature extraction network; the spatial feature extraction network includes six convolutional layers and three maximum pooling layers; and the spatiospatial feature extraction network includes three layers of convLSTM.

8. The system according to 6, wherein an input of the action recognition model is a three-channel sub-image sequence of 30 frames.

9. The system according to 6, wherein the action recognition model also includes a Softmax function, and the Softmax function is used to determine classification results.

10. The system according to 6, wherein the target-box enlarged area is a square, and a side length of the square is expressed as:

$$L_i = \sqrt{\left(w_i + \alpha\frac{w_i + h_i}{2}\right)\left(h_i + \alpha\frac{w_i + h_i}{2}\right)};$$

where $L_i$ represents a side length of the target-box enlarged area corresponding to a i-th frame image in the video sequence, $\alpha$ is a scale coefficient, $w_i$ represents a short side length of the target box, and $h_i$ represents a long side length of the target box.

\* \* \* \* \*